United States Patent
Nasiri Khormuji

(10) Patent No.: US 10,972,234 B2
(45) Date of Patent: Apr. 6, 2021

(54) DEVICES, METHODS AND COMPUTER PROGRAMS FOR WIRELESS COMMUNICATION WITH MULTIPLE-ACCESS

(71) Applicant: Huawei Technologies Co., Ltd., Shenzhen (CN)

(72) Inventor: Majid Nasiri Khormuji, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/408,803

(22) Filed: May 10, 2019

(65) Prior Publication Data
US 2019/0268116 A1    Aug. 29, 2019

Related U.S. Application Data

(63) Continuation of application No. PCT/EP2016/077304, filed on Nov. 10, 2016.

(51) Int. Cl.
*H04W 72/04* (2009.01)
*H04L 5/00* (2006.01)
(Continued)

(52) U.S. Cl.
CPC ......... *H04L 5/0035* (2013.01); *H04B 7/0413* (2013.01); *H04B 7/0421* (2013.01);
(Continued)

(58) Field of Classification Search
CPC ... H04L 5/0035; H04B 7/0413; H04B 7/0421; H04B 7/0617; H04B 7/318; H04B 7/0434; H04B 7/0456; H04J 11/0046
See application file for complete search history.

(56) References Cited

U.S. PATENT DOCUMENTS

| 10,560,959 B2 * | 2/2020 | Kumar ............... H04W 72/1284 |
| 2014/0050279 A1 * | 2/2014 | Kishiyama ............... H04B 7/24 375/285 |

(Continued)

FOREIGN PATENT DOCUMENTS

| CN | 105874724 A | 8/2016 |
| WO | 2015085574 A1 | 6/2015 |

(Continued)

OTHER PUBLICATIONS

Bayesteh et al., "Blind Detection of SCMA for Uplink Grant-Free Multiple-Access", 2014 IEEE, 6 pages.
(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

A network node device includes a radio transceiver configured to receive a data sequence from a plurality of user equipments (UEs) over first and second sets of resource elements, wherein the first set of resource elements is mapped non-orthogonally and the second set is mapped orthogonally. The network node device further comprises a processor configured to determine channel vectors based at least in part on the data sequence received over the first set of resource elements or over the second set of resource elements, and to utilize the data sequence as received over the second set of resource elements to associate the determined channel vectors with each of the plurality of UEs.

21 Claims, 8 Drawing Sheets

(51) Int. Cl.
*H04B 17/318* (2015.01)
*H04B 7/0426* (2017.01)
*H04B 7/0456* (2017.01)
*H04B 7/0413* (2017.01)
*H04B 7/0417* (2017.01)
*H04B 7/06* (2006.01)
*H04J 11/00* (2006.01)

(52) U.S. Cl.
CPC ......... *H04B 7/0434* (2013.01); *H04B 7/0456* (2013.01); *H04B 7/0617* (2013.01); *H04B 17/318* (2015.01); *H04J 11/0046* (2013.01)

(56) References Cited

U.S. PATENT DOCUMENTS

| | | | |
|---|---|---|---|
| 2014/0160949 A1* | 6/2014 | Clausen | H04L 5/0073 370/252 |
| 2014/0198761 A1* | 7/2014 | Hooli | H04W 72/085 370/329 |
| 2015/0312074 A1 | 10/2015 | Zhu et al. | |
| 2016/0135066 A1* | 5/2016 | Xu | H04L 25/0204 370/252 |
| 2017/0315900 A1* | 11/2017 | Benedict | G06F 11/263 |
| 2018/0124684 A1* | 5/2018 | Kwon | H04W 48/10 |
| 2018/0124796 A1* | 5/2018 | Noh | H04W 28/04 |
| 2018/0309549 A1* | 10/2018 | Papadopoulos | H04L 5/0058 |
| 2019/0074876 A1* | 3/2019 | Kakishima | H04L 5/0007 |

FOREIGN PATENT DOCUMENTS

| | | |
|---|---|---|
| WO | 2015149812 A1 | 10/2015 |
| WO | 2016064246 A1 | 4/2016 |

OTHER PUBLICATIONS

Marzetta, "Noncooperative Cellular Wireless with Unlimited Numbers of Base Station Antennas", IEEE Transactions on Wireless Communications, 9(11):3590-3600 (2010).

* cited by examiner

DEVICES, METHODS AND COMPUTER PROGRAMS FOR WIRELESS COMMUNICATION WITH MULTIPLE-ACCESS

CROSS REFERENCE TO RELATED APPLICATIONS

This application is a continuation of International Application No. PCT/EP2016/077304, filed on Nov. 10, 2016, which is hereby incorporated by reference in its entirety.

TECHNICAL FIELD

The present application relates to the field of wireless communications, and more particularly, to a network node device, user equipment, and related methods and computer programs.

BACKGROUND

Wireless systems typically utilize so called multiple access schemes to efficiently share available radio resources (e.g. time, frequency, power, etc.) with multiple users. These multiple access schemes include e.g. Orthogonal Frequency Division Multiple Access (OFDMA), Code Division Multiple Access (CDMA) and Time Division Multiple Access (TDMA). These technologies, though adequate until now, may not be sufficient for future wireless networks, such as for planned fifth generation networks.

Massive multiple-input and multiple-output (mMIMO, a.k.a large-scale arrays) is a planned solution to enhance the aggregate rate of future wireless systems through Non-Orthogonal Multiple-Access (NOMA). In order to enable the potential gain of mMIMO, the spatial channels between the users and the massive arrays may need to be acquired. Towards this end, a conventional solution is to allocate a substantial portion of the time-frequency resources for channel estimation. In order to optimize the network capacity for large enough antenna arrays, half of the time-frequency resources may need to be allocated for the channel estimation in each cell. Orthogonal pilot allocation for multiple users may be used to estimate the channels of the corresponding users which consume a notable amount of time-frequency resources.

The intra-cell interference by orthogonal pilot allocation will vanish as the number of antennas increases. However, the inter-cell interference for the users that have the same pilot sequence will remain since the number of mutually orthogonal sequences is limited. This phenomenon is known as pilot contamination (a.k.a reference symbol (RS) contamination). The pilot contamination can severely degrade the performance of the mMIMO systems. In particular, when two cell-edge users employ the same pilot sequence, the interference among these users will remain despite the fact that the antenna arrays are equipped with many antenna elements.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the embodiments of the invention to provide improved wireless communication with multiple access. The foregoing and other objects are achieved by the features of the independent claims. Further implementation forms are apparent from the dependent claims, the description and the figures.

According to a first aspect a network node device is provided, the network node device comprising: a radio transceiver configured to receive a data sequence from a plurality of user equipment over a first set of resource elements and a second set of resource elements, wherein the first set of resource elements is mapped non-orthogonally and the second set of resource elements is mapped orthogonally; and a processor configured to: determine channel vectors based on at least the data sequence received over the first set of resource elements or the second set of resource elements, and utilize the data sequence received over the second set of resource elements to associate the determined channel vectors with each of the plurality of user equipment. Data from multiple users is multiplexed in a way that allows the receiving network node device to perform blind data detection to estimate spatial channels without uplink pilot resources, thereby avoiding pilot contamination as well as eliminating the pilot overhead and thereby resulting in efficient utilization of spectral resources.

In a first possible implementation of the network node device according to the first aspect, the processor is further configured to determine the channel vectors based on a scaled covariance matrix of the data sequence over at least one of the first set of resource elements and the second set of resource elements, determine eigenvalues and eigenvectors of the determined scaled covariance matrix, and scale the eigenvectors to obtain a candidate set of channel vectors. Based on how data from multiple users is multiplexed, the receiving network node device can identify a candidate set of channel vectors, thereby allowing blind data detection to estimate spatial channels without uplink pilot resources.

In a second possible implementation of the network node device according to the first implementation of the first aspect, the processor is further configured to perform the association of the channel vectors by determining correlations between the data sequence received over the second set of resource elements and the channel vectors in the obtained candidate set of channel vectors. Based on how data from multiple users is multiplexed, the receiving network node device can associate the identified candidate channel vectors with the transmitting user devices, thereby allowing blind data detection to estimate spatial channels without uplink pilot resources.

In a third possible implementation of the network node device according to the first implementation of the first aspect, the processor is further configured to perform the association of the channel vectors by: determining normalized average received power of the data sequence received over the second set of resource elements, and selecting a channel vector in the obtained candidate set of channel vectors with eigenvalue closest to the determined normalized average received power. Based on how data from multiple users is multiplexed, the receiving network node device can associate the identified candidate channel vectors with the transmitting user devices, thereby allowing blind data detection to estimate spatial channels without uplink pilot resources.

In a fourth possible implementation of the network node device according to the first aspect as such or according to any of the preceding implementations of the first aspect, the processor is further configured to determine the total number of resource elements in the first set of resource elements and the second set of resource elements based on radio channel coherence time and radio channel coherence bandwidth. Data from multiple users is multiplexed in a way that allows the receiving network node device to perform blind data detection to estimate spatial channels without uplink pilot resources, thereby avoiding pilot contamination as well as eliminating the pilot overhead and thereby resulting in efficient utilization of spectral resources.

In a fifth possible implementation of the network node device according to the fourth implementation of the first aspect, the processor is further configured to determine the number of resource elements in the second set of resource elements as the sum of uplink data layers transmitted from each of the plurality of user equipment, and the processor is further configured to determine the number of resource elements in the first set of resource elements as the difference between the total number of resource elements and the number of resource elements in the second set of resource elements. Data from multiple users is multiplexed in a way that allows the receiving network node device to perform blind data detection to estimate spatial channels without uplink pilot resources, thereby avoiding pilot contamination as well as eliminating the pilot overhead and thereby resulting in efficient utilization of spectral resources.

In a sixth possible implementation of the network node device according to the first aspect as such or according to any of the preceding implementations of the first aspect, the processor is further configured to cause the transceiver to send information about determined first and second sets of resource elements to the plurality of user equipment. Sending the information to the plurality of user equipment allows the plurality of user equipment to send their data multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a seventh possible implementation of the network node device according to the first aspect as such or according to any of the preceding implementations of the first aspect, the processor is further configured to determine the first set of resource elements and the second set of resource elements based on information stored in the network node device. Based on the stored information on how data from multiple users is multiplexed, the receiving network node device can associate the identified candidate channel vectors with the transmitting user devices, thereby allowing blind data detection to estimate spatial channels without uplink pilot resources.

According to a second aspect a method is provided, the method comprising: receiving, by a network node device, a data sequence from a plurality of user equipment over a first set of resource elements and a second set of resource elements, wherein the first set of resource elements is mapped non-orthogonally and the second set of resource elements is mapped orthogonally; determining, by the network node device, channel vectors based at least on the data sequence received over the first set of resource elements or the second set of resource elements; and utilizing, by the network node device, the data sequence received over the second set of resource elements to associate the determined channel vectors with each of the plurality of user equipment. Data from multiple users is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a first possible implementation of the method according to the second aspect, the method further comprises: determining, by the network node device, the channel vectors based on a scaled covariance matrix of the data sequence over at least one of the first set of resource elements and the second set of resource elements; determining, by the network node device, eigenvalues and eigenvectors of the determined scaled covariance matrix; and scaling, by the network node device, the eigenvectors to obtain a candidate set of channel vectors. Based on how data from multiple users is multiplexed, the receiving network node device can identify a candidate set of channel vectors, thereby allowing blind data detection to estimate spatial channels without uplink pilot resources.

In a second possible implementation of the method according to the first implementation of the second aspect, the method further comprises performing the association of the channel vectors by: determining, by the network node device, correlations between the data sequence received over the second set of resource elements and the channel vectors in the obtained candidate set of channel vectors. Based on how data from multiple users is multiplexed, the receiving network node device can associate the identified candidate channel vectors with the transmitting user devices, thereby allowing blind data detection to estimate spatial channels without uplink pilot resources.

In a third possible implementation of the method according to the first implementation of the second aspect, the method further comprises performing the association of the channel vectors by: determining, by the network node device, normalized average received power of the data sequence received over the second set of resource elements; and selecting, by the network node device, a channel vector in the obtained candidate set of channel vectors with eigenvalue closest to the determined normalized average received power. Based on how data from multiple users is multiplexed, the receiving network node device can associate the identified candidate channel vectors with the transmitting user devices, thereby allowing blind data detection to estimate spatial channels without uplink pilot resources.

In a fourth possible implementation of the method according to the second aspect as such or according to any of the preceding implementations of the second aspect, the method further comprises: determining, by the network node device, the total number of resource elements in the first set of resource elements and the second set of resource elements based on radio channel coherence time and radio channel coherence bandwidth. Data from multiple users is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a fifth possible implementation of the method according to the fourth implementation of the second aspect, the method further comprises: determining, by the network node device, the number of resource elements in the second set of resource elements as the sum of uplink data layers transmitted from each of the plurality of user equipment; and determining, by the network node device, the number of resource elements in the first set of resource elements as the difference between the total number of resource elements and the number of resource elements in the second set of resource elements. Data from multiple users is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a sixth possible implementation of the method according to the second aspect as such or according to any of the preceding implementations of the second aspect, the method further comprises: sending, by the network node device, information about determined first and second sets of resource elements to the plurality of user equipment. Sending the information to the plurality of user equipment allows the plurality of user equipment to send their data multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a seventh possible implementation of the method according to the second aspect as such or according to any of the preceding implementations of the second aspect, the method further comprises: determining, by the network node device, the first set of resource elements and the second set of resource elements based on information stored in the network node device. Based on the stored information on how data from multiple users is multiplexed, the receiving network node device can associate the identified candidate channel vectors with the transmitting user devices, thereby allowing blind data detection to estimate spatial channels without uplink pilot resources.

In an eighth possible implementation of the method according to the second aspect as such or according to any of the preceding implementations of the second aspect, a computer program comprising program code is configured to perform the method, when the computer program is executed on a computer. Data from multiple users is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

According to a third aspect a user equipment is provided, the user equipment comprising: a processor configured to access a resource element assignment of a first set of resource elements and a second set of resource elements, wherein the first set of resource elements is mapped non-orthogonally and the second set of resource elements is mapped orthogonally; and a radio transceiver configured to transmit a data sequence to a network node device over the first set of resource elements and over the second set of resource elements. Data transmitted from the user equipment is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a first possible implementation of the user equipment according to the third aspect, the user equipment further comprises a storage configured to store the resource element assignment. Based on the stored information, data transmitted from the user equipment can be multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a second possible implementation of the user equipment according to the third aspect as such or according to any of the preceding implementations of the third aspect, the radio transceiver is further configured to receive the resource element assignment from a network node device. Based on the received information, data transmitted from the user equipment can be multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

According to a fourth aspect a method is provided, the method comprising: accessing, by a user equipment, a resource element assignment of a first set of resource elements and a second set of resource elements, wherein the first set of resource elements is mapped non-orthogonally and the second set of re-source elements is mapped orthogonally; and transmitting, by the user equipment, a data sequence to a network node device over the first set of resource elements and over the second set of resource elements. Data transmitted from the user equipment is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a first possible implementation of the method according to the fourth aspect, the method further comprises: storing, by the user equipment, the resource element assignment. Based on the stored information, data transmitted from the user equipment can be multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a second possible implementation of the method according to the fourth aspect as such or according to any of the preceding implementations of the fourth aspect, the method further comprises: receiving, by the user equipment, the resource element assignment from a network node device. Based on the received information, data transmitted from the user equipment can be multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

In a third possible implementation of the method according to the fourth aspect as such or according to any of the preceding implementations of the fourth aspect, a computer program comprising program code is configured to perform the method, when the computer program is executed on a computer. Data transmitted from the user equipment is multiplexed in a way that allows the receiving network node device to perform blind data detection to estimate spatial channels without uplink pilot resources, thereby avoiding pilot contamination as well as eliminating the pilot overhead, and thereby resulting in efficient utilization of spectral resources.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by and/or provided for in different embodiments.

In the following description, multiple-access schemes are discussed in which data of multiple users is multiplexed in a way to facilitate blind data detection in mMIMO systems in order to enable a network node, such as a mMIMO access node, to estimate the channels of the users without dedicated pilot resources for channel estimation. Thus, there is no pilot contamination since pilot-assisted channel estimation is not relied upon for data detection.

In the following examples, resource elements may be divided into two sets in each coherence window of the time-frequency plane that spans a coherence time, $T_c$, (i.e. a time duration over which the radio channel can be assumed almost unchanged) and a coherence bandwidth, $B_c$, (i.e. a bandwidth over which the radio channel can be assumed almost unchanged). The coherence time depends on the velocity of users and a typical number in long-term evolution (LTE) systems is around 0.5 milliseconds. The coherence bandwidth depends on the multi-path delay spread and a typical number is around a few kilohertz. The first set of the resource elements may be common and shared by all users (or user equipment) such that data mapping is done via Non-Orthogonal Multiple-Access (NOMA). The second set of resource elements may be used and mapped orthogonally for data transmission of different users to enable Orthogonal Multiple-Access (OMA). The receiver (or receiving network node device) may first form a covariance matrix of the received signal over the common resources in the first set, and then perform blind channel estimations to identify a candidate set of channel vectors. At this point, it is unknown which channel vector belongs to which user. Using the orthogonally received data sequences in the second set which are user-specific after de-multiplexing the channel estimates may be associated with each user. Having estimated and associated the channels, uplink (UL) data detection or downlink (DL) precoding may be performed without any cost of UL pilot transmission and the pilot contamination.

Herein, "blind" data detection and channel estimation refers to the receiver having no access to pilot signals with only data sequences having been transmitted by the users. In other words, all or at least most of the time-frequency resources are used for data transmission.

Figure 1A:
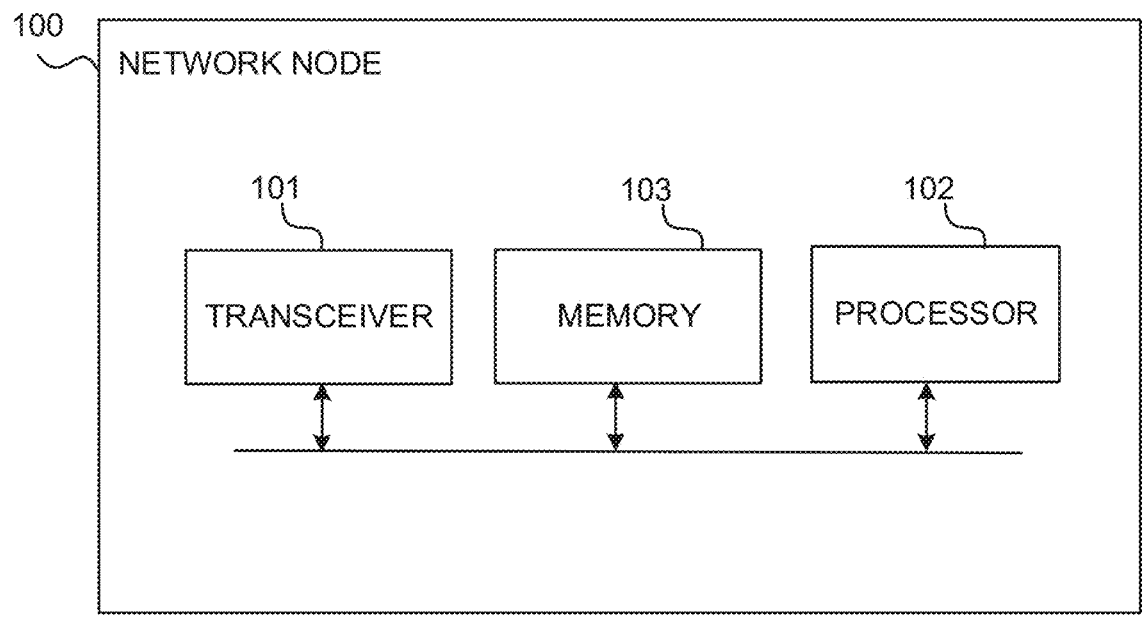
FIG. 1A is a block diagram illustrating a network node device according to an example.

FIG. 1A is a block diagram that illustrates a network node device 100 according to an example. Network node devices may include any device providing an air interface for user equipment to connect to a wireless network via multiple-access techniques, such as base stations including mMIMO access nodes.

The network node device 100 comprises a radio transceiver 101 that is configured to receive one or more data sequences from a plurality of user equipment (including e.g. the user equipment 110 of FIG. 1B) over a first set of resource elements and a second set of resource elements. The first set of resource elements is mapped non-orthogonally, and the second set of resource elements is mapped orthogonally.

In other words, the uplink data resource elements (RE) in time and frequency may be divided into two sets of REs as follows.

The first or common set of REs consists of time-frequency resources that may be shared by all users. That is, all users may utilize these resources to transmit their modulated data sequences. These uplink data resource elements are used via NOMA such that the data sequences will be separated in the spatial domain provided by a massive MIMO receiver.

The second or user-specific set of REs consists of time-frequency resources that may be specific to each user. That is, all users are may be assigned non-overlapping time-frequency resources (e.g. via Frequency-Division Multiplexing (FDM) or Time-Division Multiplexing (TDM)), and/or Mutually Orthogonal Spreading Codes, such as Code-Division Multiplexing (CDM)) to orthogonally multiplex and transmit modulated data sequences over this second set of resources. This set of time-frequency REs carries users' data via Orthogonal Multiple-Access (OMA).

Figure 4A:
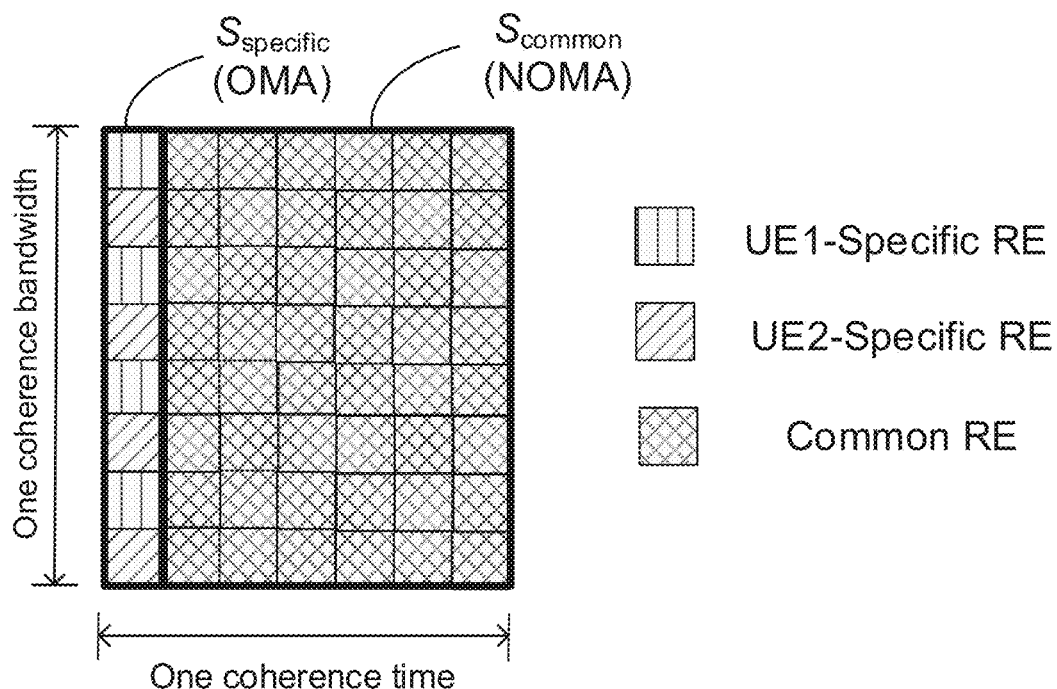
FIG. 4A illustrates a multiple-access scheme according to an example.
Figure 4B:
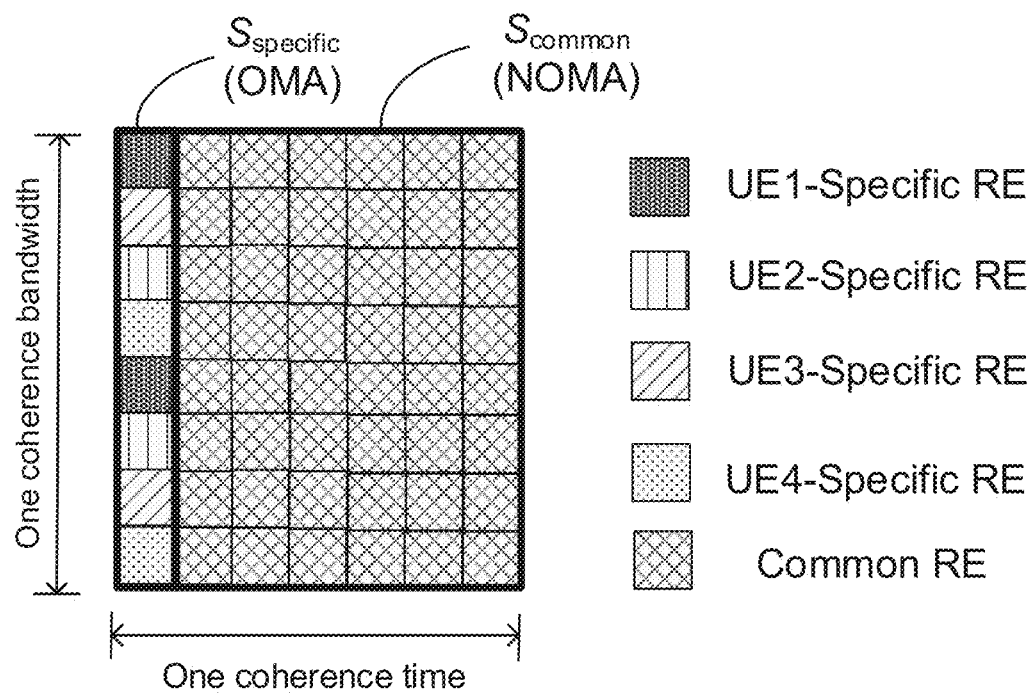
FIG. 4B illustrates a multiple-access scheme according to an example.

FIG. 4A illustrates an example 410 of data multiplexing for two users over a coherence window (one coherence time*one coherence bandwidth) of a radio channel. FIG. 4B illustrates another example 420 for four users. In these examples, FDM is used for the mapping of the data sequences in the user-specific set of the resources, and NOMA is used over the common set of REs. Here, the set of total resources over the coherence window is denoted as $S_{cw}$ where the cardinality of this set is $|S_{cw}|=T_c \times B_c$ with $T_c$ and $B_c$ being, respectively, the number of resource elements in the time and frequency domains in the coherence window of the channel. The set of resources for each user is denoted as $S_i$ for $i=1, 2, \ldots, K$ where K is the total number of users scheduled in each coherence window. This results in the following properties on the common set of recourses $S_{common}$ and user-specific set of resources $S_{specific}$:

$$\cup_{i=1}^{K} S_i = S_{cw}$$

$$\cap_{i=1}^{K} S_i = S_{common}$$

$$(\cup_{i=1}^{K} S_i) - (\cap_{i=1}^{K} S_i) = S_{specific}$$

$$S_{common} \cup S_{specific} = S_{cw} \quad (1)$$

where the resources in $S_{common}$ are used for Non-Orthogonal Multiple-Access and the resources in $S_{specific}$ are used for Orthogonal Multiple-Access. The user-specific set is divided into K disjoint subsets to carry user-specific data sequences with orthogonal mapping. The same approach can be used for TDM or a combination of FDM and TDM to generate non-overlapping resource elements in the user-specific set of REs. Code-Division Multiplexing (CDM) can be also used for orthogonal transmission of the data sequences mapped in the user-specific set of the resource elements since the channel is almost flat over the coherence window. One example approach is to use covering codes obtained from columns/rows of Hadamard matrices which satisfy the mutual orthogonality of the rows/columns as $HH^T = I$. An example construction of Hadamard matrices with entries chosen from $\{\pm 1\}$ is given by $$H_{2^k} = H_2 \otimes H_{2^{k-1}} \quad (2)$$

where k is an integer larger than one, $\otimes$ denotes Kronecker product, $H_1 = [1]$ and $$H_2 = \begin{bmatrix} 1 & 1 \\ 1 & -1 \end{bmatrix}.$$

Figure 5:
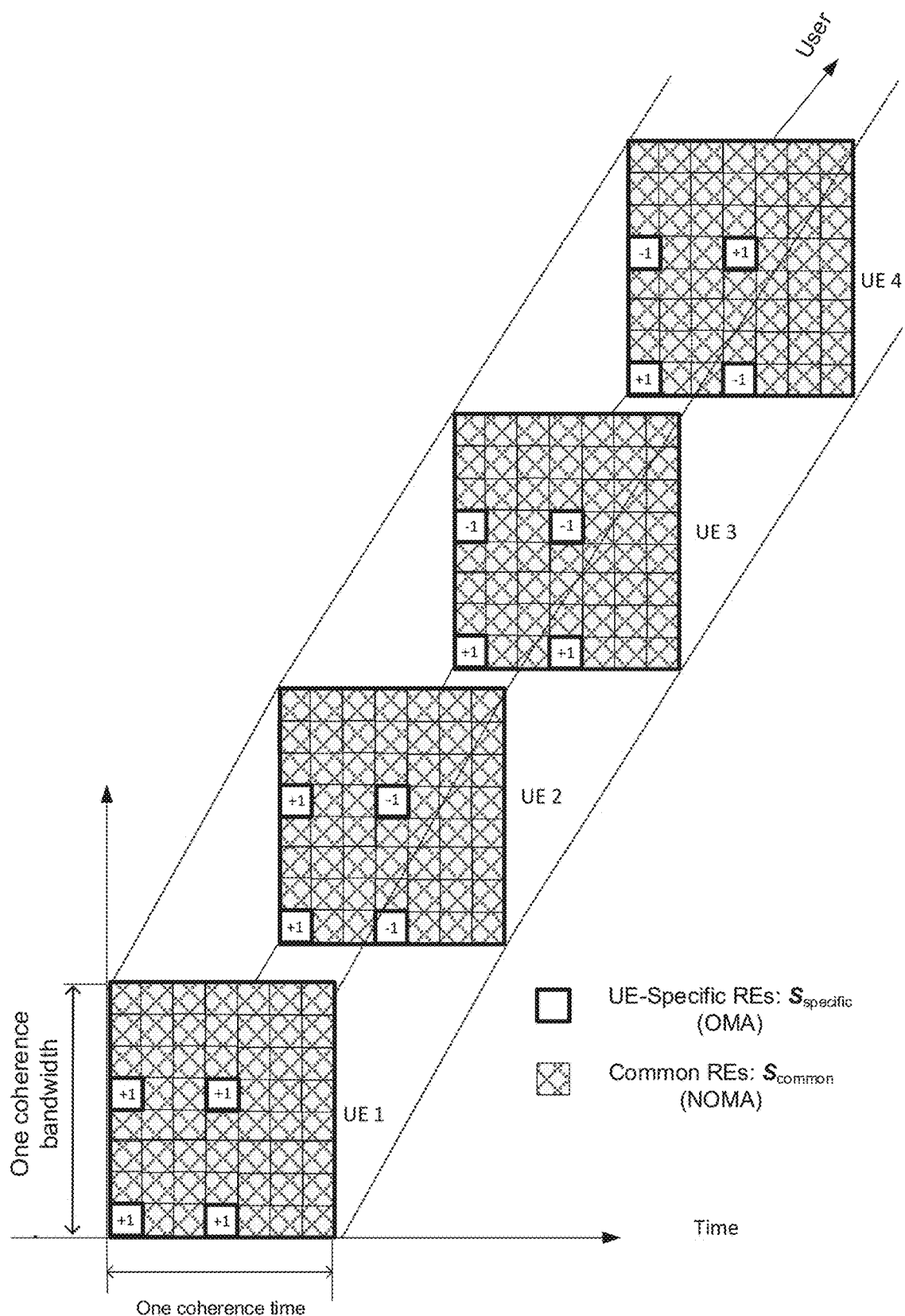
FIG. 5 illustrates a multiple-access scheme according to an example.

However, it is to be understood that this approach is not limited to any particular mutually orthogonal spreading code. FIG. 5 illustrates an example 510 of a blind multiple-access scheme for four users with mutual orthogonal spreading codes from a Hadamard matrix of size four in the user-specific set of the resource elements, and with NOMA without spreading in the common set of REs. Here, each user may transmit one symbol spread over four REs so that in total one symbol/RE is transmitted in the user-specific set for the four users. It is to be understood that the location of the user-specific set may be changed depending on the design to enable enhanced blind channel estimation. The common set of REs may be used by all users to transmit data without spreading via NOMA.

The network node device 100 further comprises a processor 102 that is configured to determine channel vectors based on at least the data sequence received over the first set of resource elements or the second set of resource elements. The processor 102 is further configured to utilize the data sequence received over the second set of resource elements to associate the determined channel vectors with each of the plurality of user equipment.

The processor 102 may be further configured to determine the channel vectors based on a scaled covariance matrix of the data sequence over at least one of the first set of resource elements and the second set of resource elements, determine eigenvalues and eigenvectors of the determined scaled covariance matrix, and scale the eigenvectors to obtain a candidate set of channel vectors.

The following example illustrates that for large arrays the channel vectors are eigenvectors of the covariance matrix of the received data signal over the coherence interval. An example for two users is used for ease of illustration. The received data signal over the common set of resource elements for an array with $n_t$ antennas is given by:

$$y_d = \underbrace{\sqrt{\beta_1}\, h_1 x_1}_{\substack{\text{desired} \\ \text{information} \\ \text{of UE 1}}} + \underbrace{\sqrt{\beta_2}\, h_2 x_2}_{\substack{\text{desired} \\ \text{information} \\ \text{of UE 2}}} + \underbrace{z}_{AWGN} \quad (3)$$

where $x_i$, $h_i$ and $\beta_i$, respectively, denote the transmitted modulated data symbol, the channel vector with size $n_t \times 1$, and large-scale channel coefficient of user $i=1, 2$. The channel will be approximately constant over the coherence window of the radio channel that spans $T_c \times B_c$, but the modulated data signals $x_1$ and $x_2$ are varying according to an i.i.d. (independent and identically distributed) distribution. Then, the normalized covariance matrix may be calculated with respect to the data signals $x_i$ and additive white Gaussian noise (AWGN) in the coherence window as follows:

$$R_y = \frac{1}{n_t} \mathbb{E}\{y_d y_d^\dagger\}$$

$$= \frac{1}{n_t} \mathbb{E}\{(\sqrt{\beta_1}\, h_1 x_1 + \sqrt{\beta_2}\, h_2 x_2 + z)(\sqrt{\beta_1}\, h_1 x_1 + \sqrt{\beta_2}\, h_2 x_2 + z)^\dagger\}$$

$$= \frac{1}{n_t} \beta_1 h_1 h_1^\dagger \underbrace{\mathbb{E}\{x_1 x_1^\dagger\}}_{P_1} + \frac{1}{n_t} \beta_2 h_2 h_2^\dagger \underbrace{\mathbb{E}\{x_2 x_2^\dagger\}}_{P_2} +$$

$$\frac{1}{n_t} \sqrt{\beta_1 \beta_2}\, h_2 h_1^\dagger \underbrace{\mathbb{E}\{x_2 x_1^\dagger\}}_{=0} + \frac{1}{n_t} \sqrt{\beta_2 \beta_1}\, h_1 h_2^\dagger \underbrace{\mathbb{E}\{x_1 x_2^\dagger\}}_{=0} +$$

$$\frac{1}{n_t} \sqrt{\beta_1}\, h_1^\dagger \underbrace{\mathbb{E}\{x_1 z^\dagger\}}_{=0} + \frac{1}{n_t} \sqrt{\beta_2}\, h_2^\dagger \underbrace{\mathbb{E}\{x_2 z^\dagger\}}_{=0} + \frac{1}{n_t} \underbrace{\mathbb{E}\{z z^\dagger\}}_{N_o I}$$

$$= \frac{1}{n_t} \beta_1 P_1 h_1 h_1^\dagger + \frac{1}{n_t} P_2 \beta_2 h_2 h_2^\dagger + \frac{1}{n_t} N_o I$$

where the above equation (4) follows from the signals $x_1$, $x_2$ and $z$ being mutually uncorrelated.

For large arrays, $$\frac{1}{n_t} N_o I \approx 0$$

applies. Thus, the covariance matrix of the above equation (4) can be approximated as:

$$R_y \approx \frac{1}{n_t} \beta_1 P_1 h_1 h_1^\dagger + \frac{1}{n_t} P_2 \beta_2 h_2 h_2^\dagger \quad (5)$$

Large arrays also satisfy the conditions $$\frac{1}{n_t} h_1 h_2^\dagger \approx 0 \text{ and } \frac{1}{n_t} h_2 h_1^\dagger \approx 0$$

due to asymptotic mutual orthogonality of the channels in mMIMO systems. Thus, these terms can be added to the right-hand side (RHS) of equation (5), as they are approximately zeros. This yields:

$$R_y \approx \frac{1}{n_t}\beta_1 P_1 h_1 h_1^\dagger + \frac{1}{n_t} P_2 \beta_2 h_2 h_2^\dagger + \frac{1}{n_t}\beta_1 P_1 h_1 h_2^\dagger + \frac{1}{n_t}\beta_2 P_2 h_2 h_1^\dagger \quad (6)$$

$$= \underbrace{\left[\frac{1}{\sqrt{n_t}}h_1 \quad \frac{1}{\sqrt{n_t}}h_2 \quad 0 \quad \ldots \quad 0\right]}_{:=V} \underbrace{\begin{bmatrix} \beta_1 P_1 & 0 & \cdots & 0 \\ 0 & \beta_2 P_2 & \cdots & 0 \\ \vdots & \vdots & \ddots & \cdots \\ 0 & 0 & \cdots & 0 \end{bmatrix}}_{:=\Lambda}$$

$$\underbrace{\left[\frac{1}{\sqrt{n_t}}h_1 \quad \frac{1}{\sqrt{n_t}}h_2 \quad 0 \quad \ldots \quad 0\right]^\dagger}_{:=V^\dagger}$$

$$= V\Lambda V^\dagger$$

That is, the channel vectors of the users that are normalized by $\sqrt{n_t}$ are approximately the eigenvector of the covariance matrix of the received signals over the coherence interval with the approximate eigenvalue $\beta_i P_i$, which is the long-term channel gain multiplied by the transmit power.

Using the above argument, the network node device 100 may compute a normalized sampled covariance matrix of the received data sequences from the common set of REs, e.g. according to:

$$\hat{R}_y = \frac{1}{N \cdot n_t} \sum_{i=1}^{N} y_{d,i} y_{d,i}^\dagger \quad (7)$$

where $y_{d,i} = \sqrt{\beta_1} h_1 x_{1,i} + \sqrt{\beta_2} h_2 x_{2,i} + z_i$ is the received signal vector over the ith resource element in the common set. The number of samples N can be set to the number of resource elements in the common set as $N=|S_{common}|$. Next, let the eigenvalue and the eigenvectors of the matrix $\hat{R}_y$ be denoted as $\lambda_i, v_i$. Then, the candidate set of the channel vectors can be constructed as $$\mathbb{h} := \left\{\sqrt{n_t \frac{\lambda_i}{P_i}} v_i\right\}_{i=1}^{K}$$

where K is number of the users. The scaling $\sqrt{n_t}$ is added due to the norm of the eigenvector $v_i$ being one.

The processor 102 may be further configured to perform the association of the channel vectors by determining correlations between the data sequence received over the second set of resource elements and the channel vectors in the obtained candidate set of channel vectors.

The processor 102 may be further configured to perform the association of the channel vectors by determining normalized average received power of the data sequence received over the second set of resource elements, and selecting a channel vector in the obtained candidate set of channel vectors with eigenvalue closest to the determined normalized average received power.

As an example, the user-specific received data that are orthogonally multiplexed using FDM, TDM or CDM, may be used to identify which estimated channel belongs to which user. For user j, the received orthogonal data signal (after de-spreading if CDM is used) can be written as $$y_{d,j} = \underbrace{\sqrt{\beta_j} h_j x_j}_{\substack{\text{desired} \\ \text{orthogonally} \\ \text{multiplexed} \\ \text{information}}} + \underbrace{z_j}_{AWGN} \quad (8)$$

The set of estimated channel candidates for the two users is $$\mathbb{h} = \left\{\sqrt{n_t \frac{\lambda_1}{P_1}} v_1, \sqrt{n_t \frac{\lambda_2}{P_2}} v_2\right\}$$

for which it is not known which one of the vectors respectively estimates the actual channel vectors $h_1$ and $h_2$.

Using the normalized matched filtering (i.e. correlation) of the received data signal with the candidate set $\mathbb{h}$, the following measure can be obtained:

$$\rho_{ji} = \frac{|y_{d,j}^\dagger v_i|}{\|y_{d,j}\| \cdot \|v_i\|} \quad (9)$$

Since for large arrays $\sqrt{n_t}\{v_1, v_2\} \to \{h_1 h_2\}$ as the number of antenna elements increases (see equations (6) and (7) above), the above correlation may be simplified to:

$$\rho_{ji} \approx \begin{cases} 1, & i = j \\ 0, & i \neq j \end{cases} \quad (10)$$

In other words, the computation of $\rho_{ji}$ for large arrays shows a polarized behavior. That is, those eigenvectors that approximate the actual channel show a correlation close to one and the other eigenvectors show a correlation close to zero. Thus, the channel association can be done using this approach. Thus, the network node device 100 may determine that a member of the candidate set of channel estimates corresponds to the channel of a user if it gives the highest correlation to its user-specific received data.

Another approach for association is to determine the normalized received power of the UE-specific data sequences as $$\frac{1}{n_t}\|y_{d,j}\|^2 = \frac{1}{n_t}\left(\sqrt{\beta_j} h_j x_j + z_j\right)^\dagger \left(\sqrt{\beta_j} h_j x_j + z_j\right) \approx P_j \beta_j \quad (11)$$

Thus, this value may be used to find the correct channel estimate in the candidate set if $P_j\beta_j \neq P_i\beta_i$ for all $1 \leq i, j \leq k$ and $i \neq j$. In cases for which $P_j\beta_j \approx P_i\beta_i$, the correlation method may be used.

The processor 102 may be further configured to determine the total number of resource elements in the first set of resource elements and the second set of resource elements based on radio channel coherence time and radio channel coherence bandwidth.

Furthermore, the processor 102 may be configured to determine the number of resource elements in the second set of resource elements as the sum of uplink data layers transmitted from each of the plurality of user equipment.

Furthermore, the processor 102 may be configured to determine the number of resource elements in the first set of resource elements as the difference between the total number of resource elements and the number of resource elements in the second set of resource elements.

The processor 102 may be further configured to determine the first set of resource elements and the second set of resource elements based on information stored in the network node device. The network node device 100 may comprise a storage or a memory 103 that configured to store the information about the first set of resource elements and the second set of resource elements. The processor 102 may be further configured to cause the transceiver to send the information about the determined first and second sets of resource elements to the plurality of user equipment.

Figure 1B:
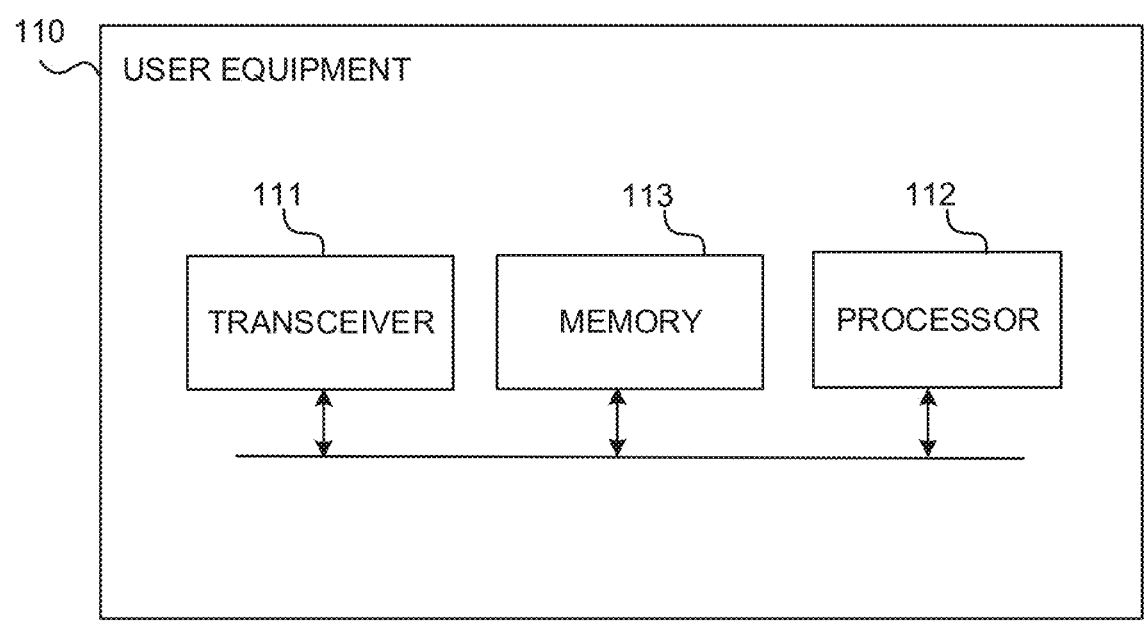
FIG. 1B is a block diagram illustrating user equipment according to an example.

FIG. 1B is a block diagram illustrating user equipment 110 according to an example. User equipment may include various types of devices used by an end user entity and capable of communication in a wireless network. Such devices include but are not limited to smartphones, tablet computers, smart watches, lap top computers, Internet-of-Things (IoT) devices, and the like.

The user equipment 110 comprises a processor 112 that is configured to access a resource element assignment of a first set of resource elements and a second set of resource elements. The first set of resource elements is mapped non-orthogonally and the second set of resource elements is mapped orthogonally.

The user equipment 110 further comprises a radio transceiver 111 that is configured to transmit a data sequence to a network node device (such as the network node device 100 of FIG. 1A) over the first set of resource elements and over the second set of resource elements.

The user equipment 110 may further comprise a storage or a memory 113 that is configured to store the resource element assignment. The radio transceiver 111 may be further configured to receive the resource element assignment from the network node device (such as the network node device 100 of FIG. 1A).

UE-specific and antenna-port specific data may be transmitted such that the uplink data over the second set at different antenna ports for each UE are also orthogonally multiplexed. For a case of correlated antennas at UE side, a whitening filter based on the correlation matrix at the UE side can be used prior to the transmission at the UE side. This way the effective channel at the network node device appears orthogonal and the same procedure can be used to blindly estimate the channels.

Figure 2A:
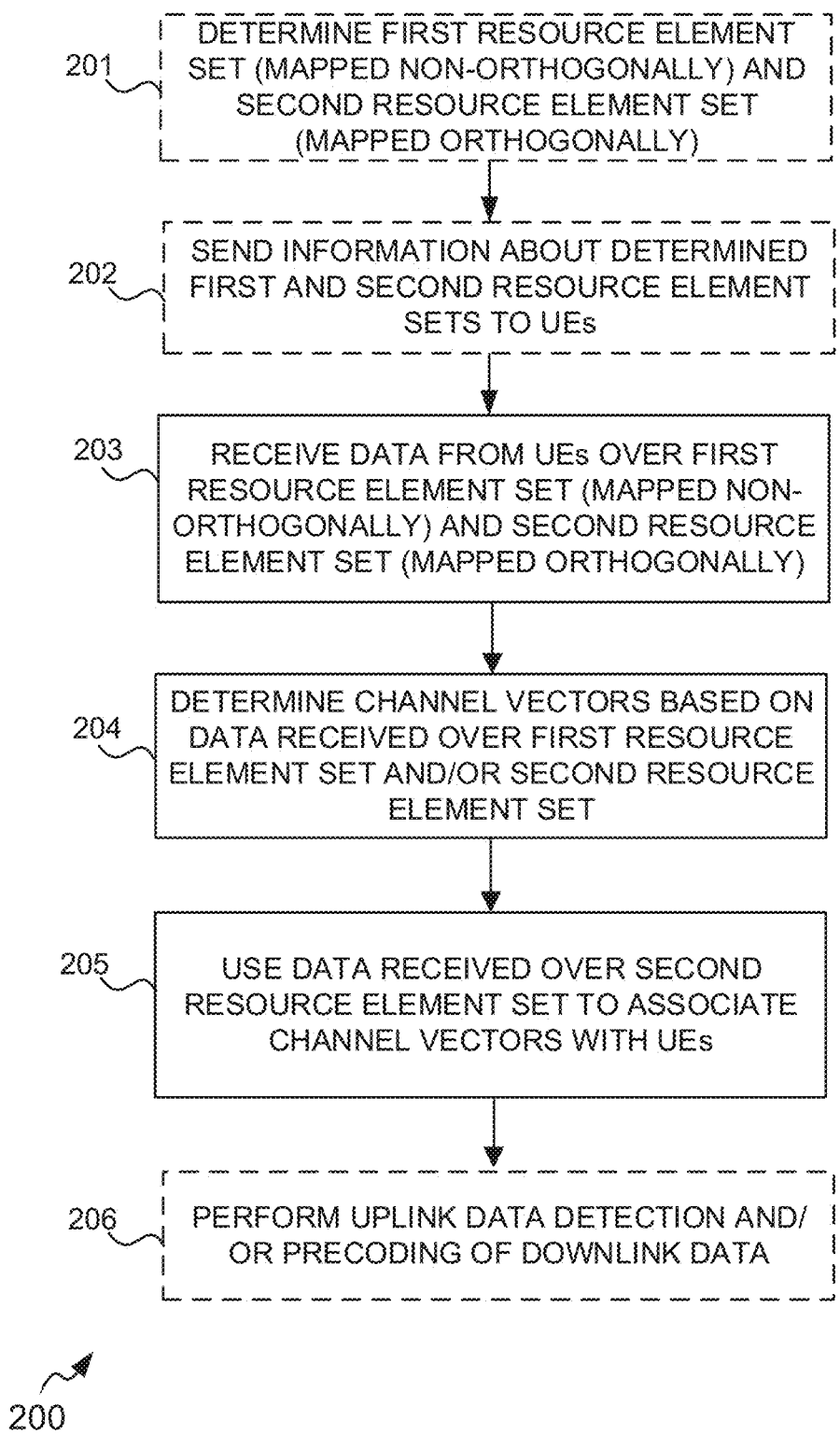
FIG. 2A is a flow chart illustrating a method according to an example.

FIG. 2A is a flow chart illustrating a method 200 according to an example. In the examples of FIG. 2A to 3B, the network node device may comprise the network node device 100 of FIG. 1A. Furthermore, in the examples of FIG. 2A to 3B, the user equipment may comprise the user equipment 110 of FIG. 1B. Some of the features of the described devices are optional features which provide further advantages.

At operation 201, a network node device may determine a first set of resource elements and a second set of resource elements. The first set of resource elements is mapped non-orthogonally and the second set of resource elements is mapped orthogonally. The network node device may determine the first set of resource elements and the second set of resource elements based on information stored in the network node device.

The network node device may determine the total number of resource elements in the first set of resource elements and the second set of resource elements based on radio channel coherence time and radio channel coherence bandwidth. For example, as discussed in connection with FIG. 1A, the network node device may determine the total number of resource elements in the first set of resource elements and the second set of resource elements based on the channel coherence time $T_c$ and coherence bandwidth $B_c$ of the radio channels, such that the total number of REs in the two sets is less than or equal to the product of $T_c$ and $B_c$.

Furthermore, the network node device may determine the number of resource elements in the second set of resource elements as the sum of uplink data layers transmitted from each of the plurality of user equipment. For example, as discussed in connection with FIG. 1A, the network node device may determine the number of resource elements in the second set of resource elements (i.e. for orthogonal multiple-access (OMA)) as equal to the number of users (for single-antenna UEs) or as the sum of uplink data layers transmitted from all the UEs. Furthermore, the network node device may determine the number of resource elements in the first set of resource elements as the difference between the total number of resource elements and the number of resource elements in the second set of resource elements. In other words, the number of REs for the NOMA set may equal the total number of REs minus the number of REs used for the OMA set.

At operation 202, the network node device may send information about the determined first and second sets of resource elements to the plurality of user equipment.

At operation 203, the network node device receives one or more data sequences from a plurality of user equipment over the first set of resource elements and the second set of resource elements. As discussed above, the first set of resource elements is mapped non-orthogonally and the second set of resource elements is mapped orthogonally.

At operation 204, the network node device determines channel vectors based at least on the data sequence(s) received over the first set of resource elements or the second set of resource elements.

At operation 205, the network node device utilizes the data sequence(s) received over the second set of resource elements to associate the determined channel vectors with each of the plurality of user equipment.

At optional operation 206, the network node device may perform e.g. uplink data detection (e.g. using MF (Matched Filtering) or ZF (Zero-Forcing) filters) and/or precoding of downlink data sequences using the estimated spatial channels.

Figure 2B:
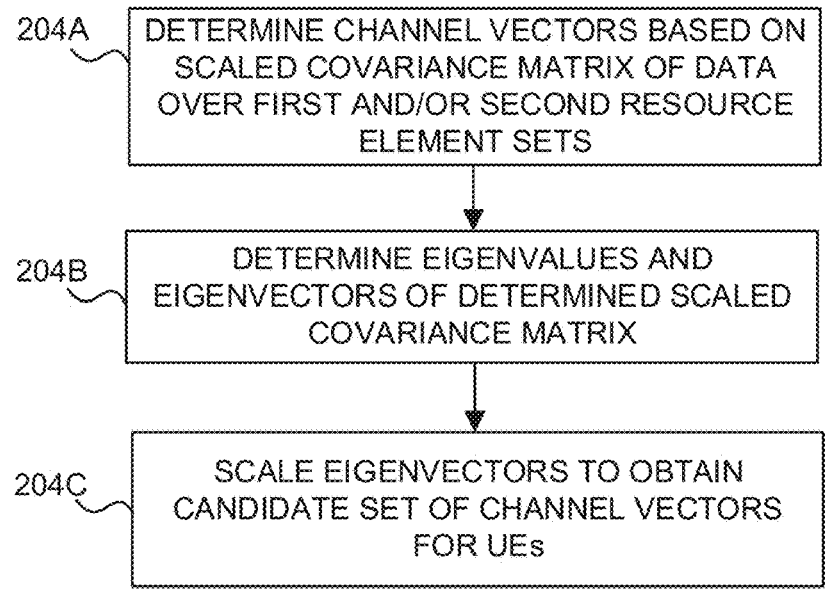
FIG. 2B is a flow chart illustrating a method according to an example.

FIG. 2B is a flow chart illustrating a method 210 according to an example. The method 210 may be an example implementation of operation 204 of FIG. 2A.

At operation 204A, the network node device may determine the channel vectors based on a scaled covariance matrix of the data sequence over at least one of the first set of resource elements and the second set of resource elements.

At operation 204B, the network node device may determine eigenvalues and eigenvectors of the determined scaled covariance matrix.

At operation 204C, the network node device may scale the eigenvectors to obtain a candidate set of channel vectors.

Figure 2C:
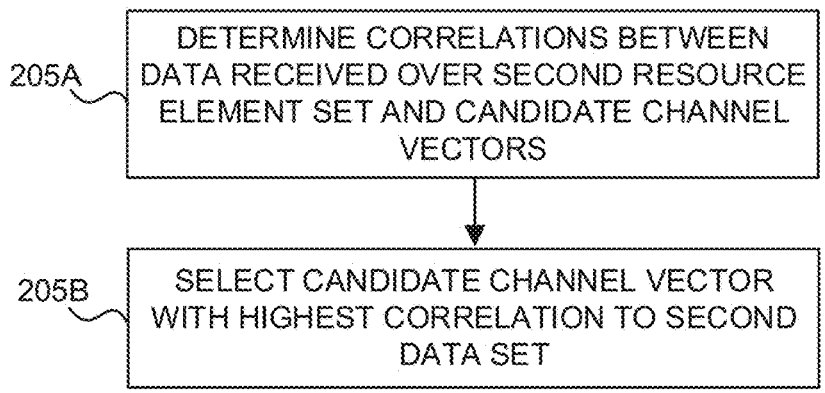
FIG. 2C is a flow chart illustrating a method according to an example.

FIG. 2C is a flow chart illustrating a method 220 according to an example. The method 220 may be an example implementation of operation 205 of FIG. 2A.

At operation 205A, the network node device may determine correlations between the data sequence received over the second set of resource elements and the channel vectors in the obtained candidate set of channel vectors.

At operation 205B, the network node device may select candidate channel vector with highest correlation to the data sequence received over the second set of resource elements.

Figure 2D:
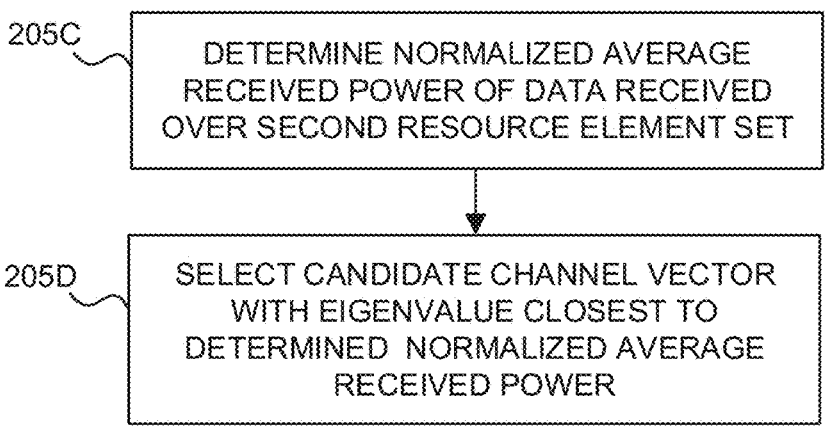
FIG. 2D is a flow chart illustrating a method according to an example.

FIG. 2D is a flow chart illustrating a method 230 according to an example. The method 230 may be an example implementation of operation 205 of FIG. 2A.

At operation 205C, the network node device may determine normalized average received power of the data sequence received over the second set of resource elements.

At operation 205D, the network node device may select a channel vector in the obtained candidate set of channel vectors with eigenvalue closest to the determined normalized average received power.

Figure 3A:
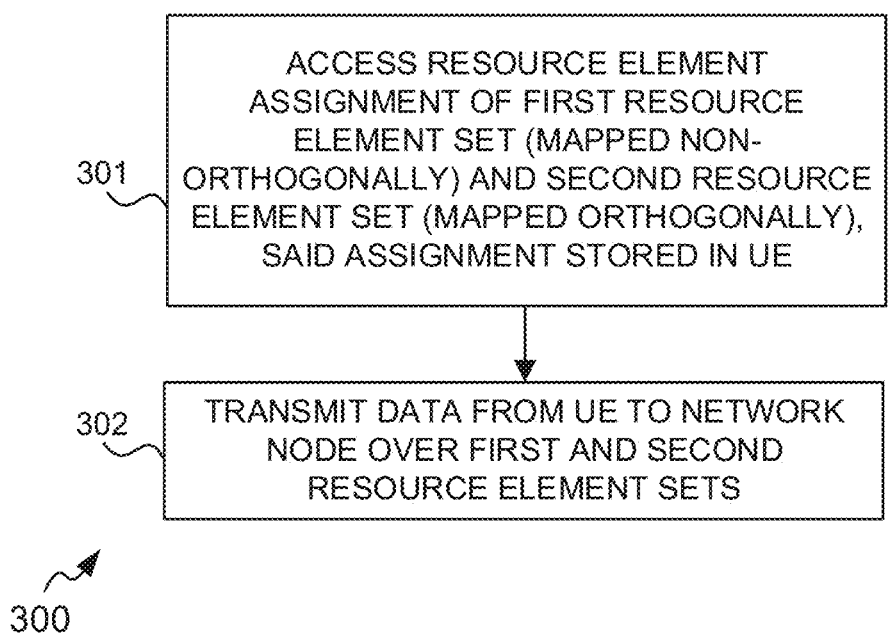
FIG. 3A is a flow chart illustrating a method according to an example.

FIG. 3A is a flow chart illustrating a method 300 according to an example.

At operation 301, a user equipment accesses a resource element assignment (i.e. mapping) of a first set of resource elements and a second set of resource elements. The first set of resource elements is mapped non-orthogonally and the second set of resource elements is mapped orthogonally. The resource element assignment has been stored in the user equipment.

At operation 302, the user equipment transmits one or more data sequences to a network node device over the first set of resource elements and over the second set of resource elements.

Figure 3B:
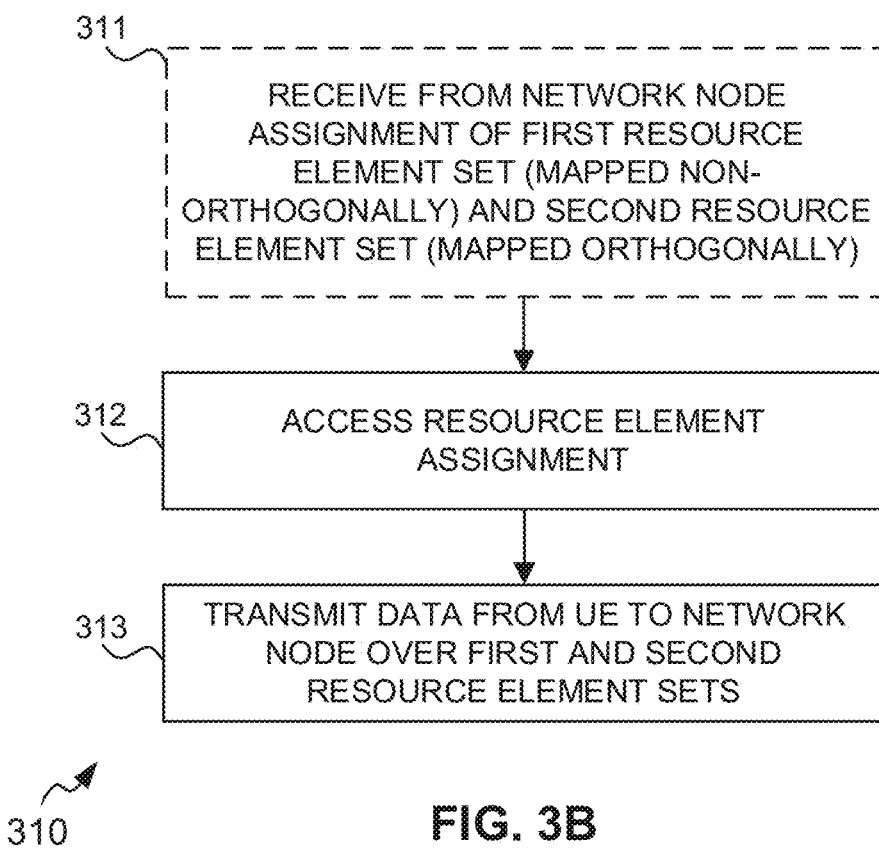
FIG. 3B is a flow chart illustrating a method according to an example.

FIG. 3B is a flow chart illustrating a method according to an example.

At operation 311, a user equipment receives a resource element assignment (i.e. mapping) of a first set of resource elements and a second set of resource elements from a network node device. The first set of resource elements is mapped non-orthogonally and the second set of re-source elements is mapped orthogonally. The received resource element assignment may then be stored in the user equipment.

At operation 312, the user equipment accesses the resource element assignment of the first set of resource elements and the second set of resource elements.

At operation 313, the user equipment transmits one or more data sequences to a network node device over the first set of resource elements and over the second set of resource elements.

Figure 6A:
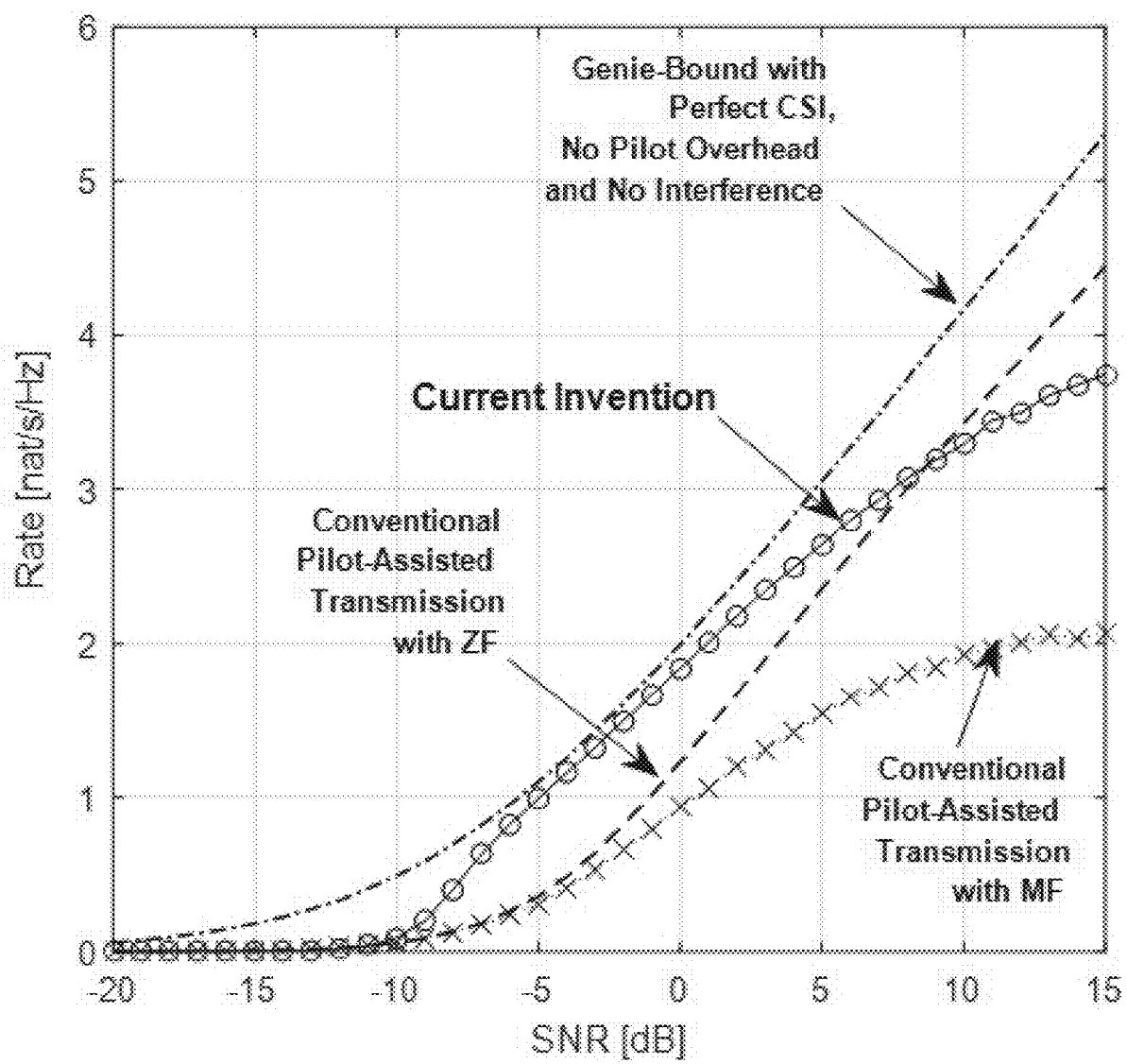
FIG. 6A illustrates transmission rates for a multiple-access scheme according to an example.
Figure 6B:
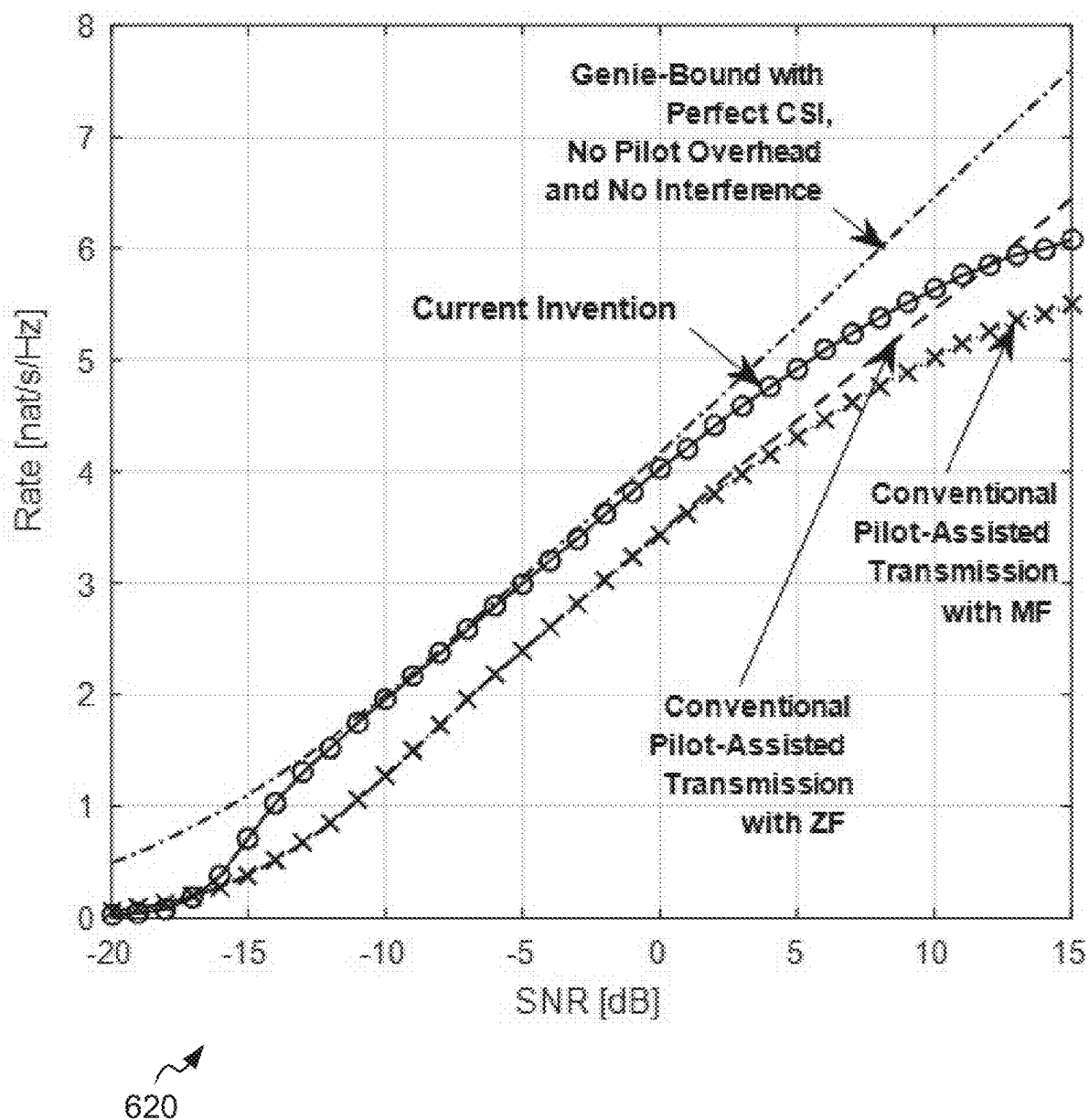
FIG. 6B illustrates transmission rates for a multiple-access scheme according to an example.

FIG. 6A illustrates transmission rates for a multiple-access scheme for a user with $\beta_1=0.1$ according to an example, and FIG. 6B illustrates transmission rates for a multiple-access scheme for a user with $\beta_2=1$ according to an example.

As discussed above, finding the channel estimates without UL pilot transmission provides better spectral efficiency, since it does not consume any resources for pilot signals (i.e. reference symbols (RS)) and it also avoids pilot contamination (a.k.a RS contamination). To illustrate the effects of the embodiments of the invention, a two-user case with a mMIMO array with 64 antenna elements is used where the channels are i.i.d. Rayleigh fading with large-scale coefficients $\beta_1=0.1$ and $\beta_2=1$, respectively. Four schemes are considered:

conventional pilot-assisted transmission with MF: in this case, the LTE 0.5 ms slot consisting of 12*7=84 resource elements with UL pilot symbols is considered. The radio channel is assumed to be constant over the transmission slot (i.e. $T_c$=7 symbols and $B_c$=12 subcarriers). The receiver estimates the channels using the assigned orthogonal pilot sequences (i.e. Code-Division Multiplexing) to avoid pilot contamination. Having estimated the channels, the receiver performs Matched Filtering (MF) over received data sequences. The rate is normalized by the pilot overhead that consumes 12 REs for both users;

conventional pilot-assisted transmission with ZF: this case is similar to that in above but the receiver performs Zero-Forcing (ZF). The rate is again normalized by the pilot overhead that consumes 12 REs for both users;

disclosed approach: in this case there is no pilot transmission and all 84 resource elements are used for data transmissions. Among the resources, only two resource elements are user-specific mapped using FDM and the remaining 82 resources are shared among the two users. The channels are estimated as discussed above. The estimated channels may then be used for MF of the received signals;

Genie-Bound with perfect CSI: this case assumes perfect Channel State Information (CSI) at no cost (no overhead is assumed in the rate) and with no multi-user interference. This provides an upper-bound for any scheme.

FIGS. 6A and 6B plot the transmission rate versus SNR=$P_t/N_0$ where $P_t$ is the transmit power of each user for the above four schemes. From FIGS. 6A and 6B, it can be seen that the disclosed approach outperforms conventional solutions with MF over the entire SNR range and it outperforms conventional solutions with ZF over a notable SNR range. The disclosed approach can perform close to the genie upper bound for a range of SNRs. The estimated channels in the scheme according to the disclosed approach are mutually orthogonal since they are the eigenvectors of a semi-definite matrix and hence ZF does not improve the rate for this case. In other words, the disclosed approach finds estimates of the channel vectors that are mutually orthogonal. The degradation of the disclosed approach in high SNR is due to the fact that the covariance matrix is only computed for 82 samples which is a low number to approximate a large covariance matrix of size $n_r \times n_r$. The high-SNR scenarios normally occur for low-mobility users whose radio channels have a much longer coherence interval and hence for these cases the covariance matrix can be better approximated. Another way to improve the result is to use larger antenna arrays since equation (6) becomes more accurate for larger arrays.

The functionality described herein can be performed, at least in part, by one or more computer program product components such as software components. According to an embodiment, the user equipment 110 and/or network node device 100 comprise a processor configured by program code to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A network node device, comprising:
a radio transceiver configured to receive, from a plurality of user equipments (UEs), a data sequence over a first set of resource elements and a second set of resource elements, wherein the first set of resource elements is mapped non-orthogonally and the second set of resource elements is mapped orthogonally; and
a processor configured to:
determine channel vectors based at least in part on the data sequence received over the first set of resource elements or the second set of resource elements, and
associate, by utilizing the data sequence received over the second set of resource elements, the determined channel vectors with each of the plurality of UEs,
wherein the processor is configured to determine channel vectors based additionally on a scaled covariance matrix of the data sequence received over at least one resource element of the first set of resource elements and the second set of resource elements, determine eigenvalues and eigenvectors of the determined scaled covariance matrix, and scale the eigenvectors to obtain, as the determined channel vectors, a candidate set of channel vectors.

2. The network node device according to claim 1, wherein the processor is configured to associate the determined channel vectors with each of the plurality of UEs by determining correlations between the data sequence received over the second set of resource elements and the channel vectors in the obtained candidate set of channel vectors.

3. The network node device according to claim 1, wherein the processor is configured to associate the determined channel vectors with each of the plurality of UEs by:
determining normalized average received power of the data sequence received over the second set of resource elements, and
selecting a channel vector in the obtained candidate set of channel vectors with an eigenvalue closest to the determined normalized average received power.

4. The network node device according to claim 1, wherein the processor is further configured to determine a total number of resource elements in the first set of resource elements and the second set of resource elements based on radio channel coherence time and radio channel coherence bandwidth.

5. The network node device according to claim 4, wherein the processor is further configured to:
determine a number of resource elements in the second set of resource elements as a sum of uplink data layers transmitted from each of the plurality of UEs, and
determine a number of resource elements in the first set of resource elements as a difference between the total number of resource elements and the number of resource elements in the second set of resource elements.

6. The network node device according to claim 1, wherein the processor is further configured to cause the transceiver to send information about determined first and second sets of resource elements to the plurality of UEs.

7. The network node device according to claim 1, wherein the processor is further configured to determine the first set of resource elements and the second set of resource elements based on information stored in the network node device.

8. A method, comprising:
receiving, by a network node device, a data sequence from a plurality of user equipments (UEs) over a first set of resource elements and a second set of resource elements, wherein the first set of resource elements is mapped non-orthogonally and the second set of resource elements is mapped orthogonally;
determining, by the network node device based at least in part on the data sequence received over the first set of resource elements or the second set of resource elements, channel vectors; and
associating, by the network node device by utilizing the data sequence received over the second set of resource elements, the determined channel vectors with each of the plurality of UEs,
wherein determining the channel vectors is based on a scaled covariance matrix of the data sequence received over at least one of the first set of resource elements and the second set of resource elements, and
wherein determining the channel vectors includes determining eigenvalues and eigenvectors of the scaled covariance matrix and scaling the eigenvectors to obtain a candidate set of channel vectors.

9. The method according to claim 8, wherein associating the determined channel vectors with each of the plurality of UEs includes determining a normalized average received power of the data sequence received over the second set of resource elements, and selecting a channel vector in the obtained candidate set of channel vectors with an eigenvalue closest to the determined normalized average received power.

10. The method according to claim 8, further comprising:
determining a total number of resource elements in the first set of resource elements and the second set of resource elements based on radio channel coherence time and radio channel coherence bandwidth.

11. The method of claim 8, wherein associating the determined channel vectors with each of the plurality of UEs includes determining correlations between the data sequence received over the second set of resource elements and the channel vectors in the obtained candidate set of channel vectors.

12. The method of claim 11, further comprising:
determining a number of resource elements in the second set of resource elements as a sum of uplink data layers transmitted from each of the plurality of UEs, and
determining a number of resource elements in the first set of resource elements as a difference between the total number of resource elements and the number of resource elements in the second set of resource elements.

13. The method of claim 8, further comprising sending information about determined first and second sets of resource elements to the plurality of UEs.

14. The method of claim 8, further comprising determining the first set of resource elements and the second set of resource elements based on information stored in the network node device.

15. A computer program product, comprising:
a non-transitory computer-readable medium storing computer executable instructions, wherein the instructions comprise instructions for:
receiving, by a network node device, a data sequence from a plurality of user equipments (UEs) over a first set of resource elements and a second set of resource elements, wherein the first set of resource elements is mapped non-orthogonally and the second set of resource elements is mapped orthogonally;
determining, by the network node device, channel vectors based at least in part on the data sequence received over the first set of resource elements or the second set of resource elements; and
associating, by the network node device by utilizing the data sequence received over the second set of resource elements, to associate the determined channel vectors with each of the plurality of UEs,
wherein determining the channel vectors is based on a scaled covariance matrix of the data sequence received over at least one of the first set of resource elements and the second set of resource elements, and
wherein determining the channel vectors includes determining eigenvalues and eigenvectors of the scaled covariance matrix and scaling the eigenvectors to obtain a candidate set of channel vectors.

16. The computer program product of claim 15, wherein the instructions comprise instructions for associating the determined channel vectors with each of the plurality of UEs by determining correlations between the data sequence received over the second set of resource elements and the channel vectors in the obtained candidate set of channel vectors.

17. The computer program product of claim 15, wherein the instructions comprise instructions for associating the determined channel vectors with each of the plurality of UEs by:
determining normalized average received power of the data sequence received over the second set of resource elements, and
selecting a channel vector in the obtained candidate set of channel vectors with an eigenvalue closest to the determined normalized average received power.

18. The computer program product of claim 15, wherein the instructions comprise instructions for determining a total number of resource elements in the first set of resource elements and the second set of resource elements based on radio channel coherence time and radio channel coherence bandwidth.

19. The computer program product of claim 18, wherein the instructions comprise instructions for:
determining a number of resource elements in the second set of resource elements as a sum of uplink data layers transmitted from each of the plurality of UEs, and
determining a number of resource elements in the first set of resource elements as a difference between the total number of resource elements and the number of resource elements in the second set of resource elements.

20. The computer program product of claim 15, wherein the instructions comprise instructions for sending information about determined first and second sets of resource elements to the plurality of UEs.

21. The computer program product of claim 15, wherein the instructions comprise instructions for determining the first set of resource elements and the second set of resource elements based on information stored in the network node device.

* * * * *